Feb. 14, 1967 — T. K. PETERSEN — 3,303,583

SATELLITE ORBITAL SIMULATOR

Filed Feb. 2, 1965 — 2 Sheets-Sheet 1

INVENTOR.
THORVALD K. PETERSEN
BY Robert O. Richardson
— ATTORNEY —

Feb. 14, 1967 T. K. PETERSEN 3,303,583
SATELLITE ORBITAL SIMULATOR
Filed Feb. 2, 1965 2 Sheets-Sheet 2
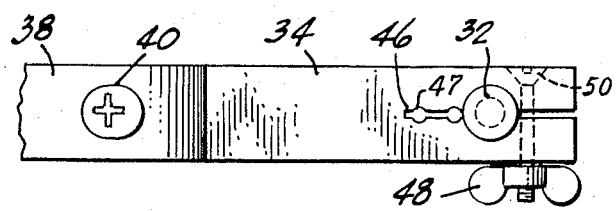
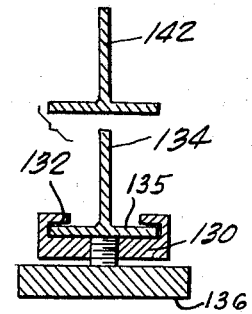
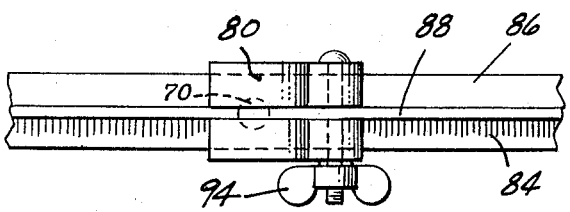
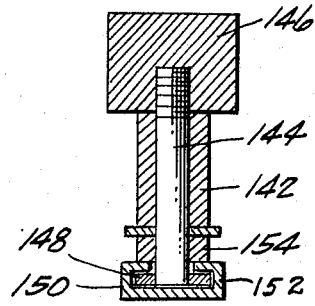
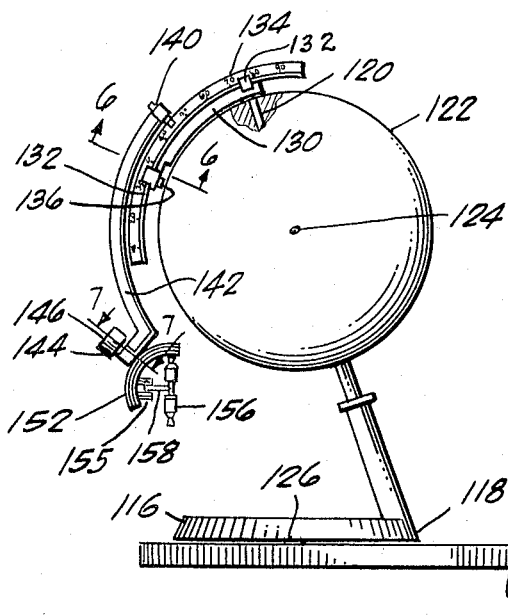
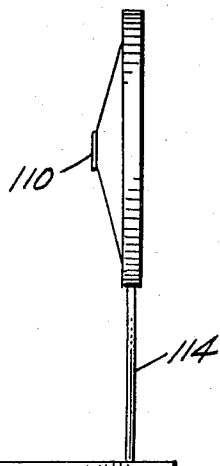
INVENTOR.
THORVALD K. PETERSEN
BY Robert O. Richardson
ATTORNEY

United States Patent Office
3,303,583
Patented Feb. 14, 1967

3,303,583
SATELLITE ORBITAL SIMULATOR
Thorvald K. Petersen, Santa Monica, Calif., assignor to Douglas Aircraft Company Inc., Santa Monica, Calif.
Filed Feb. 2, 1965, Ser. No. 429,863
2 Claims. (Cl. 35—47)

The present invention relates to satellite orbital simulators and more particularly to simulators for demonstrating circular orbital paths of a satellite, relative to a celestial body such as the earth, moon or sun, or other planets at any time of the year.

Scientists, teachers and engineers have found it extremely difficult to demonstrate satisfactorily the orbital path and articulation of a satellite relative to celestial bodies, such as the earth or moon, when using conventional media of words and sketches. A definite need exists in educational and scientific institutions and space-oriented business firms for a suitable device to demonstrate orbital paths and the relative positions and attitudes of satellites and celestial bodies. Until the conception of the present invention, no such suitable device has existed.

It is well known that the earth revolves upon an axis, the inclination of which undergoes constant and regular changes relative to the sun. A satellite orbiting over the earth's equator for example, will thus travel in different planes relative to the sun, depending upon the orbital time of year. In the simulation of specific orbits, the time of year, orbit inclination, inclination of the celestial body and orbit period must be considered, and satellite orbital simulators must be constructed with these considerations for producing a selected orbit.

The satellite orbital simulator comprising the present invention, in one embodiment, consists of a base with a simulated sun fixed to the base and spaced therefrom a rotatable earth is also mounted. The earth (or other planet) mounting is arranged to swivel on the base with the center of rotation thereof intersecting the center of the earth. The mounting has a pointer on its outer periphery which indicates respective periods of time within a specific longer period such as a year, such indications being marked on the base. The earth mounting holds the earth axis at a desired angle whereby the earth's position relative to the sun can be demonstrated for any particular part of a period of time such as a day or month. An earth axis rod has an adjustable swivel mounted link to permit the changing of the satellite orbital plane from an equatorial plane to a polar plane. The link, which can swivel about the earth axis, can demonstrate satellite orbital plane precession caused by the gravitational harmonics of the earth. This adjustable link has a satellite orbital link pivotably mounted thereon. The axis of rotation of the satellite orbital link is arranged to pass through the center of the earth regardless of the established position of the orbital plane.

The satellite orbital link may have satellite models, (one at a time) fixed or pivotably mounted thereon, via the satellite-to-earth attitude control link, which will permit an operator to demonstrate innumerable satellite model motions and attitudes.

It is therefore an object of the present invention to provide for a simulator that has the capability of demonstrating in a simple manner the orbiting path and articulation of a satellite relative to a pair of celestial bodies.

Another object is the provision of an orbital simulator wherein the planes of the orbit may range from polar to equatorial.

Another object is the provision of an orbital simulator wherein the satellite model may precess around the earth in a fixed attitude relative to the sun.

Another object is the provision of an orbital simulator wherein innumerable satellite model motions may be demonstrated.

Other objects will become more apparent as a description of the invention proceeds, having reference to the drawings wherein:

FIG. 3 is a side elevational view of a modification of the earth satellite orbital simulator;

FIG. 4 is a plan view taken along the line 4—4 of FIG. 3;

FIG. 5 is a side elevation view of another modification of the earth satellite orbital simulator;

FIG. 6 is a sectional view taken along the line 6—6 of FIG. 5; and

FIG. 7 is a sectional view taken along the line 7—7 of FIG. 5.

Figure 1:
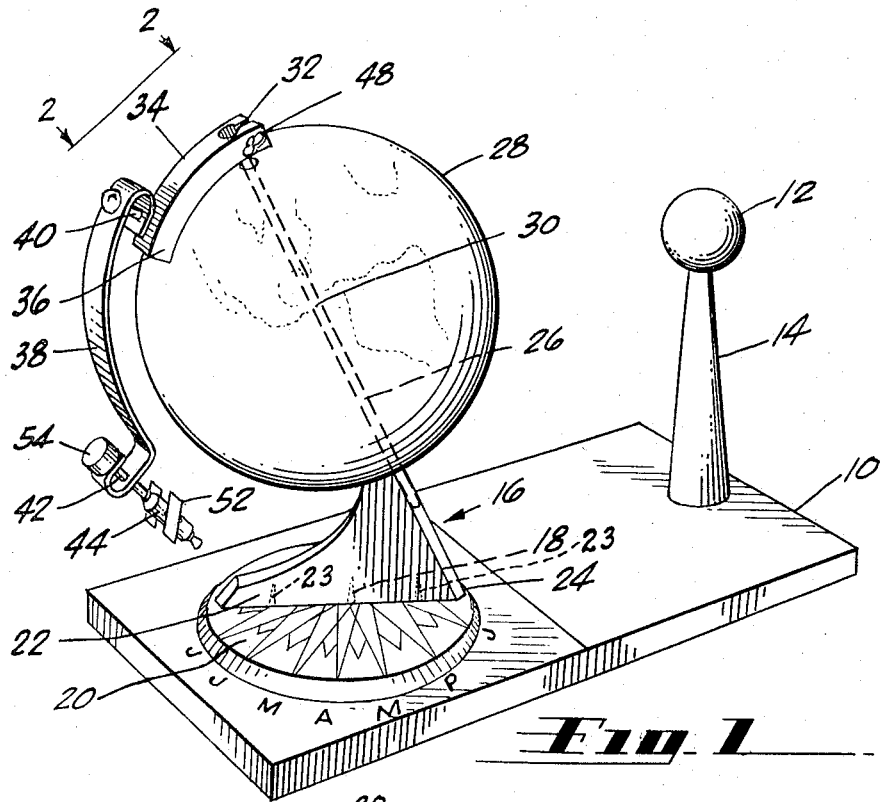
FIGURE 1 is a perspective view of an earth satellite orbital simulator.

Referring now to FIG. 1 there is shown a base structure 10 with a simulated sun 12 attached at one end of the base by means of a mounting 14. At the other end of the base structure is an earth mounting 16 rotatably mounted on the base 10 to which it is held, such as by a screw 18. This earth mounting consists of a horizontal, circular stand 20 to which an upright support 22 is diametrically attached, such as by means of screws 23. This support 22 has a pointer 24 which may be rotated about indicia means on the base indicative of a selected month. Extending angularly upwardly from support 22 is an earth axis rod 26 upon which is rotatably mounted a globe 28 representing the earth. The globe rotates about the axis extending between the north and south poles. Suitable indicia appears on the surface of the globe to depict and to illustrate geographical positions on the earth. The globe 28 thus rotates about the earth's axis rod 26 and the earth mounting 16 swivels on the base 10, with the axis of base rotation about screw 18 intersecting the center of the earth 30.

The earth axis rod 26 projects above the north pole of the earth and upon this projection portion 32 is positioned an adjustably mounted swivel link consisting of a satellite precession link 34 having at its free end 36 a satellite orbit link 38 rotatably mounted by means of link mounting 40. Attached to the lower end of the satellite orbit link 38 is a satellite control shaft 42 for rotatably mounting satellite model 44.

Figure 2:
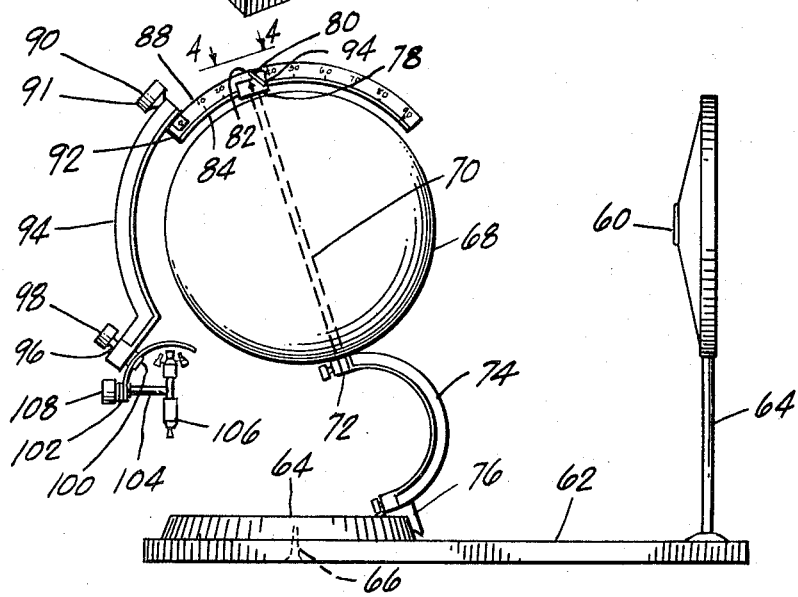
FIG. 2 is a plan view along line 2—2 of FIG. 1, showing the precession control link.

As shown in FIG. 2 the satellite precession link 34 is pivotally mounted on the projected portion 32 of the earth's axis rod 26. Slot 46 in link 34 has enlargements 47 at spaced intervals therealong, into which the projected portion 32 may be positioned in order to provide a preselected length of link 34 from its position on portion 32 to the link mounting 40. A conventional wing nut 48 and bolt 50 is used to provide link friction control in the radial positioning and angular adjustment of the satellite precession link 34. This link permits the changing of the satellite orbit plane as desired between the equatorial plane and the polar plane. This link, which can swivel about the earth's axis, can be used to demonstate satellite orbit plane precession caused by the gravitational harmonics of the earth.

The satellite orbit link 38 is pivotally mounted by link mounting 40 to the satellite precession link 34. The axis of rotation of the saellite orbit link passes through the center of the earth regardless of the orbital plane's set position. This axis of rotation is about link mounting 40 whose projected axis passes through the center of the earth 30.

Satellite model 44 has adjustable solar cells 52 thereon which, in some demonstrations, are desired to be at a fixed angular position relative to the sun 12 at all times during its earth's orbit. In accomplishing this, the satellite control knob 54 is manually held, and as the satellite model 44 is rotated about link mounting 40 the satellite mounting 38 is moved or held relative to control shaft 42, whereas control shaft 42 remains in fixed rotational position relative to sun 12. In another demonstration, the satellite control knob is not manually held, allowing the satellite to be maintained in a fixed predetermined attitude relative to the center of the earth instead of relative to the sun.

Reference is now made to the modification shown in FIGS. 3 and 4. This modification is similar in many respects to that embodiment shown in FIG. 1. Here there is shown a sun image 60 affixed to base 62 by means of mounting 64 while at the other end of base 62 is pivotally mounted an earth mounting 64 rotatable about pivot 66 whose axis extends through the center of the earth globe 68. The earth globe is rotatable about its north-south pole axis along which extends earth axis rod 70 attached at one end 72 to a 90 degree orbit clearance link 74 which is mounted on earth mounting 64. Here again, a suitable pointer 76 on the earth mounting 64 points indicia indicating the month of the year on the base 62. Earth axis rod 70 extends up through the earth north pole. Positioned on the globe 68 and attached to this extension 78 is a mounting bracket 80 to which is adjustably attached satellite precession link 82. This link is arcuate along its length so as to be at a constant distance from the earth's center. It is of inverted T configuration with ears 84, 86 and a perpendicular rib 88. Bracket 80 has a corresponding T-shaped groove therein, whereby this link may be angularly positioned in adjustably varying the distance from the bracket to its link mounting 90 at the end thereof. In this manner the satellite orbit plane axis may be angularly adjusted relative to the earth's rotational axis. Locking screw 94 on bracket 80 engages rib 88 to maintain this selected distance or angular displacement. Link mounting 90 is a bolt, attached to one end of satellite precession link 82, the axis of which passes through the center of the earth globe 68. A nut 91 in the form of a knurled knob provides the necessary friction control to position the satellite orbit link 94 in a fixed position as desired. Attached to the free end of satellite orbit link 94 is a rotatably mounted satellite control shaft 96 and control knob 98. Attached to the innermost end 100 of control shaft 96 is a slotted link 102 for satellite attitude control. At one end of this slotted link 102 is a satellite positioning shaft 104 to which a satellite model 106 is positioned, on its inner end. This satellite model is rotatably mounted and is operable by knob 108. Knobs 98 and 108 may be used to impart any type attitude or motion to the satellite 106 as it is rotated in orbit about earth globe 68. By making the 90 degree orbit clearance link 74 arcuate as shown, the satellite may be placed in a polar orbit.

Reference is now made to the embodiment shown in FIGURES 5, 6 and 7. A sun image 110 is shown in FIG. 5 mounted to one end of base 112 by a support 114. At the other end of the base 112 and pivotally mounted thereto is a globe support 116 having a pointer 118 and an earth axis rod 120 attached to the support 116 in such manner as to rotatably retain the earth globe 122 with the earth center 124 over the pivot point 126 of support 116. Pivotally mounted on the earth axis rod 120 is a rotatable satellite orbit plane precession link 130 of fixed length. Mounted on link 130 are ears 132, forming a pair of slots into which is positioned an arcuate shaped orbit plane precession link 134. As shown in FIG. 6 this link 134 is of T-shaped cross section in which the arms 135 are retained by the ears 132 in a longitudinally slidable manner to permit its movement relative to axis rod 120. Thumb screw 136 locks the adjustable precession link 134 relative to the non-adjustable link 130. Satellite orbit link 142 rotates about a pivot point 140 on the precession link 134.

When thumb screw 136 unlocks the gripping relationship between ears 132 and the T arms 135 of the precession link 134, the precessioin link 134 may be moved longitudinally relative to fixed link 130, to thereby adjust the angular relationship of the pivot point 140 with the axis of rotation of the earth, which is along the axis rod 120. The outer end of orbit link 142 may then circumscribe the earth at any angularly oriented orbit that may be desired, ranging from an orbit about the equator to an orbit about the earth's poles.

The free end of the orbit link 142, as shown in FIGS. 5 and 7, has rotatably mounted therein a satellite attitude control shaft 144 which is made rotatable by actuating knob 146. Shaft 144 has outwardly projecting ears 148 which fit into slotted trackway 150 on satellite attitude control link 152. This attitude control link is arcuate in shape and is adapted to slide over the ears 148 protruding outwardly from shaft 144. A rubber spacer 154 between the control link 152 and satellite orbit link 142 frictionally retains the control link 152 in a selected position. Satellite 156 is supported on a shaft 158, which is rotatably mounted on the control link 152 by means of a control knob 155. Knobs 155 and 146 set and control the satellite attitude as it is made to orbit around the earth globe 122.

While the foregoing embodiments provide for a manual demonstration of a satellite in orbit, it is contemplated that with the use of clocking mechanisms and motors, the orbiting of satellites may be made to operate automatically, and, of course, other celestial bodies such as the moon, other planets and stars may be used instead of the sun and the earth, as desired.

From the foregoing description of preferred embodiments, it is obvious that further modifications are contemplated and it is desired that these further modifications be considered within the scope of the appended claims.

I claim:

1. An earth satellite orbital simulator comprising:
   a base structure having a simulated heavenly body affixed thereto;
   an earth globe mounted on said base structure;
   an elongated satellite model having a longitudinal axis;
   an adjustable mounted swivel link comprising a satellite precession link having a swivelable mounting on an axis extending through the center of said earth globe, and a satellite orbit link, said satellite orbit link being rotatably mounted at one end thereof to said satellite precession link, said orbit link being rotatable about an axis extending through the center of said earth globe;
   said swivelable mounting having means for selectively adjusting the effective length of said precession link between said mounting and said one end, to thereby select an orbital plane;
   a satellite attitude control shaft rotatably mounted to said satellite orbit link on an axis parallel to the axis of rotation of said orbit link, said satellite model being rotatably mounted on an attitude control link affixed to said satellite attitude control shaft;
   said satellite attitude control shaft and said satellite attitude control link being operable to place said model longitudinal axis in predetermined angular position relative to said heavenly body; and
   handle means connected to said satellite attitude control link for maintaining said model in fixed preselected attitude relative to said heavenly body while rotating said model about the earth glode on a preselected orbit determined by the selected effective length of said precession link.

2. An earth satellite orbital simulator comprising:
   a base structure having a simulated heavenly body affixed thereto;
   an earth globe mounted on said base structure;
   an elongated satellite model having a longitudinal axis;

an adjustable mounted swivel link comprising a satellite precession link swivelable on a mounting about an axis extending through the center of said earth globe, and a satellite orbit link, said satellite orbit link being rotatably mounted at one end thereof to said satellite precession link, said orbit link having an axis of rotation passing through the center of earth globe, said swivel link having means for adjusting its effective link between its swivelable mounting and said one end;

a satellite attitude control link rotatably and slidably mounted to said satellite orbit link, said satellite model being rotatably mounted on said satellite attitude control link, said satellite attitude control link and said model being positionable to place said model longitudinal axis in predetermined angular position relative to said heavenly body; and handle means connected to said satellite attitude control link for maintaining said model in fixed preselected attitude relative to said heavenly body while rotating said model about the earth globe on a preselected orbit determined by the selected effective length of said precession link.

References Cited by the Examiner

UNITED STATES PATENTS

| | | | |
|---|---|---|---|
| 158,581 | 1/1875 | Fitz | 35—46 |
| 493,988 | 3/1893 | Dunham | 35—45 |
| 1,814,984 | 7/1931 | Vanderhider | 35—45 |
| 2,985,969 | 5/1961 | Farquhar | 35—47 |
| 3,241,252 | 3/1966 | Baalson | 35—46 |

FOREIGN PATENTS 335,110   2/1959   Switzerland.

JEROME SCHNALL, *Primary Examiner.*